United States Patent
Harrington

[11] Patent Number: 6,069,709
[45] Date of Patent: May 30, 2000

[54] BI-DIRECTIONAL PRINTING WITH OVERLAP USING BOTH BREAKS AND TRANSITION REGIONS

[75] Inventor: Steven J. Harrington, Webster, N.Y.

[73] Assignee: Xerox Corporation, Stamford, Conn.

[21] Appl. No.: 09/149,758

[22] Filed: Sep. 8, 1998

[51] Int. Cl.$^7$ .................................................. G06F 15/00
[52] U.S. Cl. .................... 358/1.8; 358/1.1; 358/1.13; 347/101; 347/174; 347/179; 400/323
[58] Field of Search .............................. 358/1.1, 1.2, 1.8, 358/1.13, 1.14, 1.9; 347/173, 174, 179, 182, 186, 2, 3, 8, 11, 14, 86, 101, 105; 400/323

[56] References Cited

U.S. PATENT DOCUMENTS

| | | | |
|---|---|---|---|
| 5,044,796 | 9/1991 | Lund | 400/323 |
| 5,859,958 | 1/1999 | Chan et al. | 358/1.18 |

*Primary Examiner*—Edward L. Coles
*Assistant Examiner*—Mark Wallerson
*Attorney, Agent, or Firm*—Fay, Sharpe, Fagan, Minnich & McKee, LLP

[57] ABSTRACT

An apparatus for bi-directionally rendering an image includes a bi-directional printer (10) having an input (12) which receives data corresponding to the input image. A printhead (14), in accordance with the data, renders the image on a medium (M) in swaths as it passes horizontally over the medium (M) in opposing first and second directions. A medium advance device (16) advances the medium (M) vertically past the printhead (14) between horizontal passes of the printhead (14) in the first direction and horizontal passes of the printhead (14) in the second direction. Horizontal swaths of the image are segmented into a line of columns (20) such that the columns (20) are made up of vertical arrays of pixels. A detector circuit (18) detects for breaks (22) in each of the columns (20) of each swath. Transition regions are defined for columns (20) having no vertical breaks (22) therein. Rendered during the first printing pass are: (i) pixels which are above vertical breaks (22) in each column; (ii) pixels which are above transition regions in each column; and, (iii) a first portion of pixels located in each of the transition regions. Rendered on the reverse printing pass are: (i) pixels which are below vertical breaks (22) in each column; (ii) pixels which are below transition regions in each column; and, (iii) a second portion of pixels located in each of the transition regions.

22 Claims, 8 Drawing Sheets

BI-DIRECTIONAL PRINTING WITH OVERLAP USING BOTH BREAKS AND TRANSITION REGIONS

BACKGROUND OF THE INVENTION

The present invention relates to the art of bi-directional printing. It finds particular application in conjunction with ink-jet printers and other similar printers or image-rendering devices with scanning or moving heads, and will be described with particular reference thereto. However, it is to be appreciated that the present invention is also amenable to other like applications.

In a scanning-head printer such as many ink-jet, dot matrix, and thermal-head printers the image is rendered on the page by multiple passes of the printhead across the page. Each pass results in the printing of a swath of the image. Overall printing speed is often improved by printing bi-directionally, that is, by printing a swath from left to right, advancing the paper, printing the next swath from right to left, advancing the paper, and so on. However, for bi-directional printing, the problem of misregistration tends to occur between swaths due to the backlash from the changed motion of the printhead.

One solution to the problem is given in U.S. Pat. No. 5,044,796 to Mark Lund, assigned to Hewlett-Packard Co. The '796 patent seeks a scan line at which there is a vertical break. If such a scan line is found (and it is greater than ¾ of the way down the printhead) then instead of imaging the full printhead height of data, the method only images data down to the break. The head is then advanced by the distance to the break (not the printhead height) and the next swath starting from this point is analyzed and rendered. If suitable breaks are found, the printing is done bi-directionally, otherwise uni-directional printing is employed. Thus, the reverse in head direction always occurs along break scans. The break scans are scans in which nothing is printed or in which there is a break in vertical alignment (i.e., for every dot in the scan, there are no dots either directly under it or at a 45-degree angle to it in the next scan). In this manner, since there are no continuous vertical edges across a break scan, it is difficult to detect the effects of misregistration. Generally, this method works, but it is too restrictive in that for bi-directional printing to be enabled, a single scan line has to be a valid break point for all columns of pixels in a given swath. Moreover, bi-directional printing is not always enabled and unidirectional printing results in generally slower rendering.

The present invention contemplates a new and improved bi-directional printing technique that overcomes the above-referenced problems and others.

SUMMARY OF THE INVENTION

In accordance with one aspect of the present invention, a method of bi-directionally rendering an image is provided. It includes segmenting a horizontal swath of the image into a line of columns such that each column is made up of a vertical array of pixels. Each column is detected for vertical breaks therein. Transition regions are defined in columns having no vertical breaks. A pass is made along the swath in a horizontal direction. During the pass, the following are rendered in the swath: (i) pixels which are above each of the detected vertical breaks; (ii) pixels which are above each of the defined transition regions; (iii) a first portion of pixels located in each of the defined transition regions; and (iv) saved pixels from a previously made pass. The following are saved for a subsequent pass: (i) pixels which are below each of the detected vertical breaks, respectively; (ii) pixels which are below each of the defined transition regions; and, (iii) a second portion of pixels located in each of the defined transition regions. Before repeating the above steps, the next swath is advanced to and the horizontal direction is reversed.

In accordance with a more limited aspect of the present invention, consecutive passes overlap.

In accordance with a more limited aspect of the present invention, the method further includes adjusting an amount of overlap between consecutive passes to optimize rendering speed and image quality.

In accordance with a more limited aspect of the present invention, the step of detecting each column for vertical breaks is limited to where consecutive passes overlap.

In accordance with a more limited aspect of the present invention, an amount of overlap between consecutive passes defines upper and lower boundaries between which the transition regions are contained.

In accordance with a more limited aspect of the present invention, the first and second portions of pixels located in each of the transition regions are exclusive of one another and collectively include all the pixels in each transition region, respectively.

In accordance with a more limited aspect of the present invention, vertically neighboring pixels in the transition regions are alternately included in the first and second portions of pixels, respectively.

In accordance with a more limited aspect of the present invention, the transition regions are divided into contiguous vertically neighboring subregions such that each subregion has a predetermined ratio of pixels in the first and second portions of pixels, respectively.

In accordance with a more limited aspect of the present invention, each transition region is divided into three subregions. The three subregions include: an upper subregion having approximately ¾ of its pixels in the first portion of pixels and approximately ¼ of its pixels in the second portion of the pixels; a lower subregion having approximately ¾ of its pixels in the second portion of pixels and a approximately ¼ of its pixels in the first portion of pixels; and, a middle subregion, located between the upper and lower subregions, having approximately half of its pixels in the first portion of pixels and approximately half of its pixels in the second portion of pixels.

In accordance with another aspect of the present invention, a bi-directional image rendering system includes a printer having an input which receives data corresponding to an input image. A printhead having a vertical height, in accordance with the data, renders the image on a medium in swaths as it passes horizontally over the medium in opposing first and second directions. A medium advance device advances the medium vertically past the printhead between horizontal passes of the printhead in the first direction and horizontal passes of the printhead in the second direction. A detector detects breaks in columns which columns comprise an array of vertically neighboring pixels of the image. As the printhead passes over the medium in the first direction, it renders pixels vertically above detected breaks, and as the printhead passes over the medium in the second direction, it renders pixels vertically below detected breaks.

In accordance with a more limited aspect of the present invention, columns having no detected breaks are divided into three regions. The three regions include: an upper region which includes pixels rendered as the printhead passes over the medium in the first direction; a lower region which includes pixels rendered as the printhead passes over the medium in the second direction; and, a transition region located between the upper and lower regions. The transition region includes a first portion of pixels rendered as the printhead passes over the medium in the first direction, and a second remaining portion of pixels rendered as the printhead passes over the medium in the second direction.

In accordance with a more limited aspect of the present invention, the medium advance device advances the medium vertically past the printhead such that printhead passes over the medium in the first direction overlap with printhead passes over the medium in the second direction.

In accordance with a more limited aspect of the present invention, an amount of overlap between printhead passes in the first and second directions defines the transition region in columns having no detected breaks.

In accordance with a more limited aspect of the present invention, an amount of overlap between printhead passes in the first and second directions is substantially equal to ¼ of the printhead's vertical height.

In accordance with a more limited aspect of the present invention, the detector detects for breaks where printhead passes in the first and second directions overlap.

In accordance with a more limited aspect of the present invention, vertically neighboring pixels in transition regions are alternately included in the first portion of pixels rendered as the printhead passes over the medium in the first direction and the second remaining portion of pixels rendered as the printhead passes over the medium in the second direction.

In accordance with a more limited aspect of the present invention, the medium advance device is tunable to vary an amount of overlap to optimize imaging speed and quality.

One advantage of the present invention is improved image quality due to a reduction in perceived vertical misregistration.

Another advantage of the present invention is increased rendering speed due to continuous bi-directional printing.

Yet another advantage of the present invention is that not all the vertical columns have to contain breaks on the same scan line.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
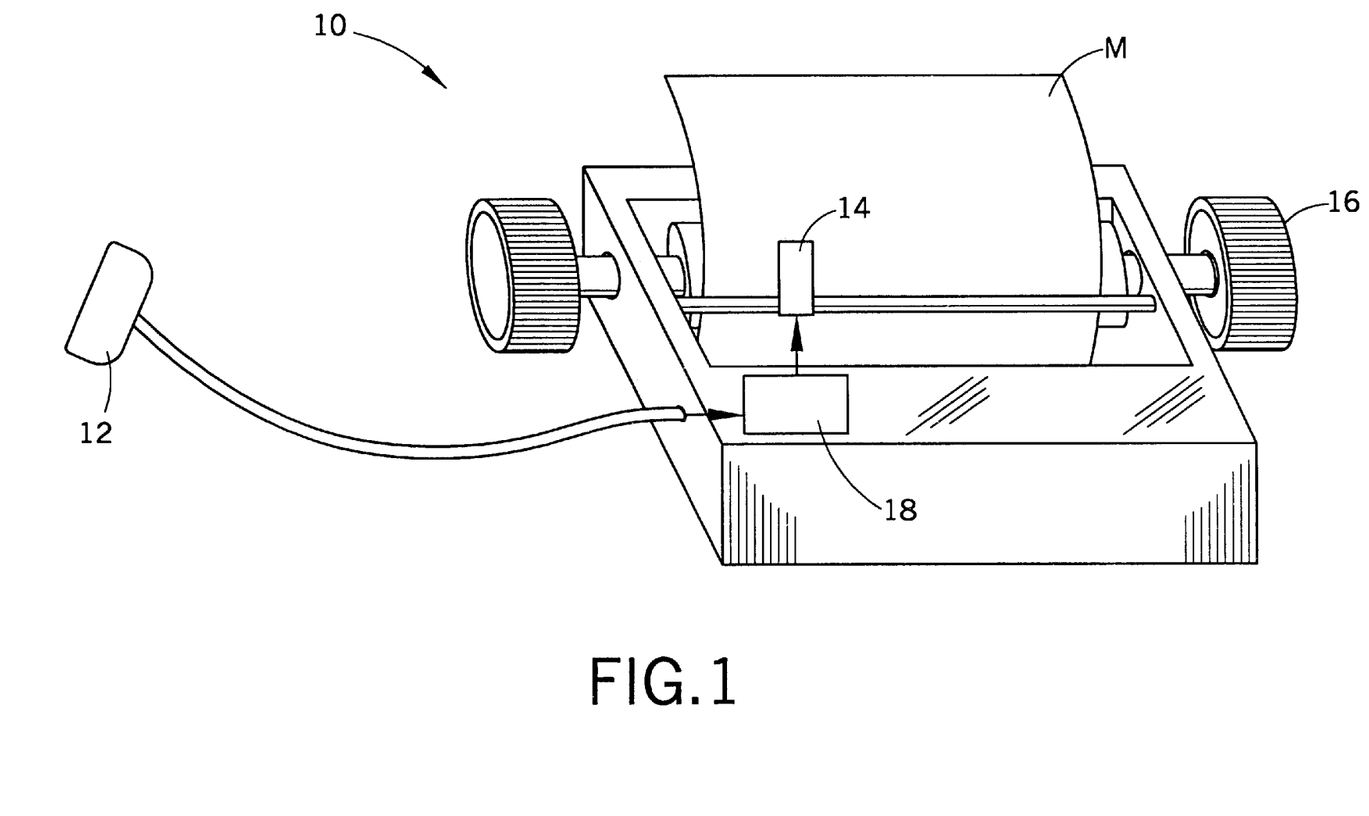
FIG. 1 is a diagrammatic illustration of a bi-directional scanning-head printer in accordance with aspects of the present invention.

With reference to FIG. 1, a bi-directional scanning-head printer 10 such as an ink-jet, dot matrix, thermal, or other like scanning-head printer has an input 12 for receiving data corresponding to an input image comprising graphics, text, halftone images, and/or the like. The printer 10 includes a scanning printhead 14 which, in accordance with the data, selectively deposits ink, toner, or the like on a medium M to render the image thereon in overlapping swaths as it passes horizontally over the medium M in opposing first and second directions. Applicable mediums are continuous fan-fold sheets of paper, individual sheets of paper, rolls of paper, transparencies, labels, or any other like medium upon which an operator desires the input image to be rendered. A medium advance device 16 such as a tractor feed, friction feed, or other like feeder advances the medium M vertically past the printhead 14 between horizontal passes of the printhead 14 in the first direction and horizontal passes of the printhead 14 in the second direction. The amount by which the medium M is advanced determines the amount of overlap between successive printhead passes and/or swaths.

With reference to FIGS. 2A through 2D and continuing reference to FIG. 1, in operation, the printer 10 via input 12 reads, receives, or otherwise acquires data corresponding to the input image. The image is segmented into horizontal overlapping swaths. The swaths' heights correspond to the vertical height of the printhead 14. Each swath includes vertical columns 20 which are made up of arrays of vertically neighboring pixels corresponding to vertical edges and/or details in the image (the columns 20 of FIGS. 2A through 2D are merely exemplary). Each swath to be rendered is analyzed by a detector circuit 18 (optionally the detector may reside directly in the printer as hardware or may be implemented as software in a print driver on a computer workstation) which detects vertical breaks 22 in each of the columns 20. The detector circuit 18 only detects for breaks 22 where swaths overlap. In one preferred embodiment, the overlap amount is ¼ the printhead's overall vertical height. Alternately, the medium advance device 16 is tunable to vary the amount by which the medium M is advanced between printerhead passes and thereby vary the amount of overlap to optimize imaging speed and quality.

Figure 2A:
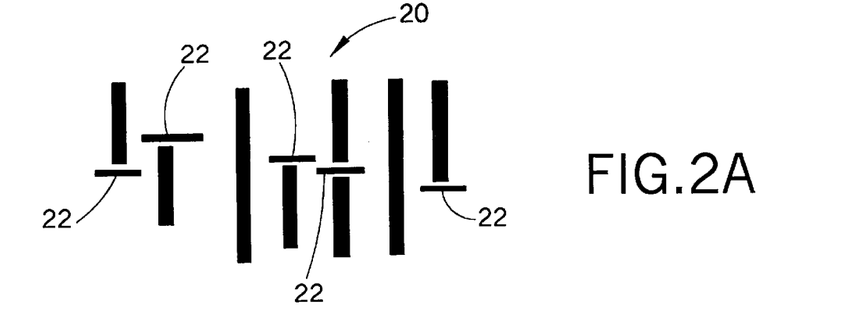
FIGS. 2A through 2D are diagrammatic illustration showing the operation of a bi-directional scanning-head printer in accordance with aspects of the present invention.
Figure 2B:
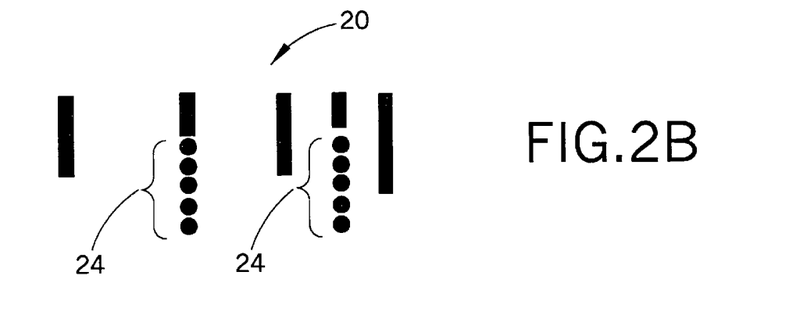
Figure 2C:
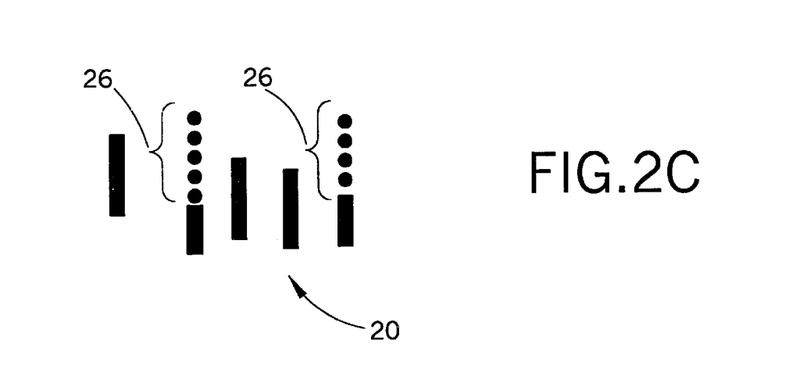

Considering any two successive swaths or printhead passes, for those columns 20 where breaks 22 are detected in the overlapping area (namely the first, second, fourth, fifth, and seventh columns as shown from left to right in FIGS. 2A through 2D), the upper ends of each column (i.e., the pixels above each break 22) are rendered as the printhead 14 passes in the first or forward direction across the medium M (as shown in FIG. 2B). The lower ends of each column (i.e. the pixels below each break 22) are rendered as the printhead 14 passes in the second or reverse direction across the medium M (as shown in FIG. 2C).

Figure 2D:
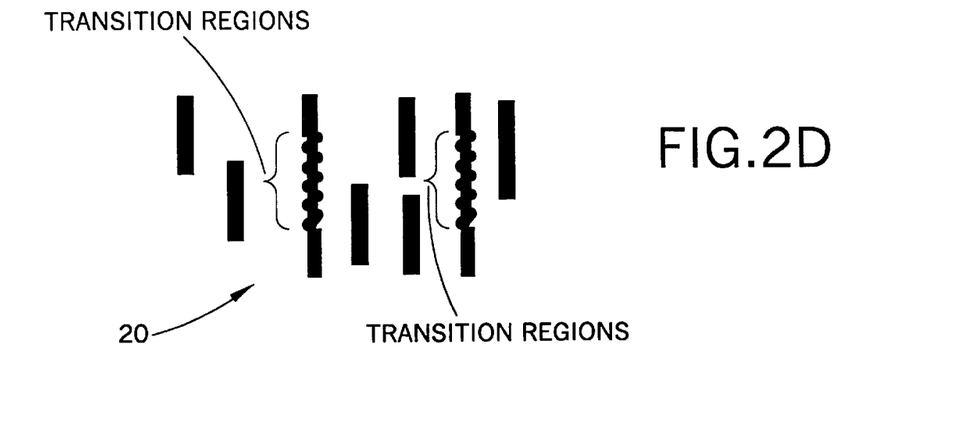

For those columns 20 where no breaks 22 are detected in the overlapping area (namely the third and sixth columns as shown from left to right in FIGS. 2A through 2D), a transition region is defined. In a preferred embodiment, the transition region is defined by the overlap. Alternately, the transition region is smaller than the overlap and located at any vertical position such that it is contained within the overlap. In these columns 20 with transition regions, the upper ends of each column (i.e., the pixels above each transition region) are rendered as the printhead 14 passes in the first or forward direction across the medium M (as shown in FIG. 2B). The lower ends of each column (i.e., the pixels below each transition region) are rendered as the printhead 14 passes in the second or reverse direction across the medium M (as shown in FIG. 2C). The pixels in each transition region are categorized into one of two portions of pixels. The first portion of the pixels (indicated generally by reference number 24) are rendered as the printhead 14 passes in the first or forward direction across the medium M (see FIG. 2B), and the second remaining portion of the pixels (indicated generally by reference number 26) are rendered as the printhead 14 passes in the second or reverse direction across the medium M (see FIG. 2C). The pixels in the transition regions that are rendered with each of the opposite printerhead passes are chosen to minimize misregistration effects by smoothly blending or blurring vertical edges of the image where successive swaths overlap. FIG. 2D shows the collective rendering after successive passes of the printhead 14 and is the combination of FIGS. 2B and 2C.

Figure 3A:
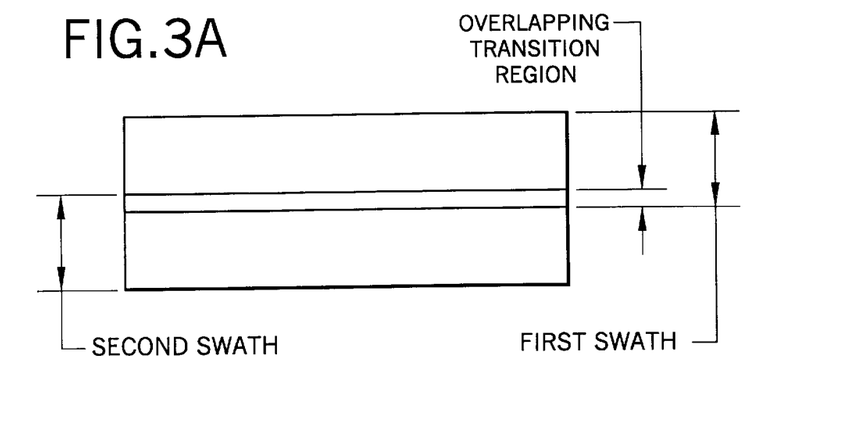
FIGS. 3A through 3E are diagrammatic illustrations showing details of the rendering of transition regions by a bi-directional scanning-head printer in accordance with aspects of the present invention.
Figure 3B:
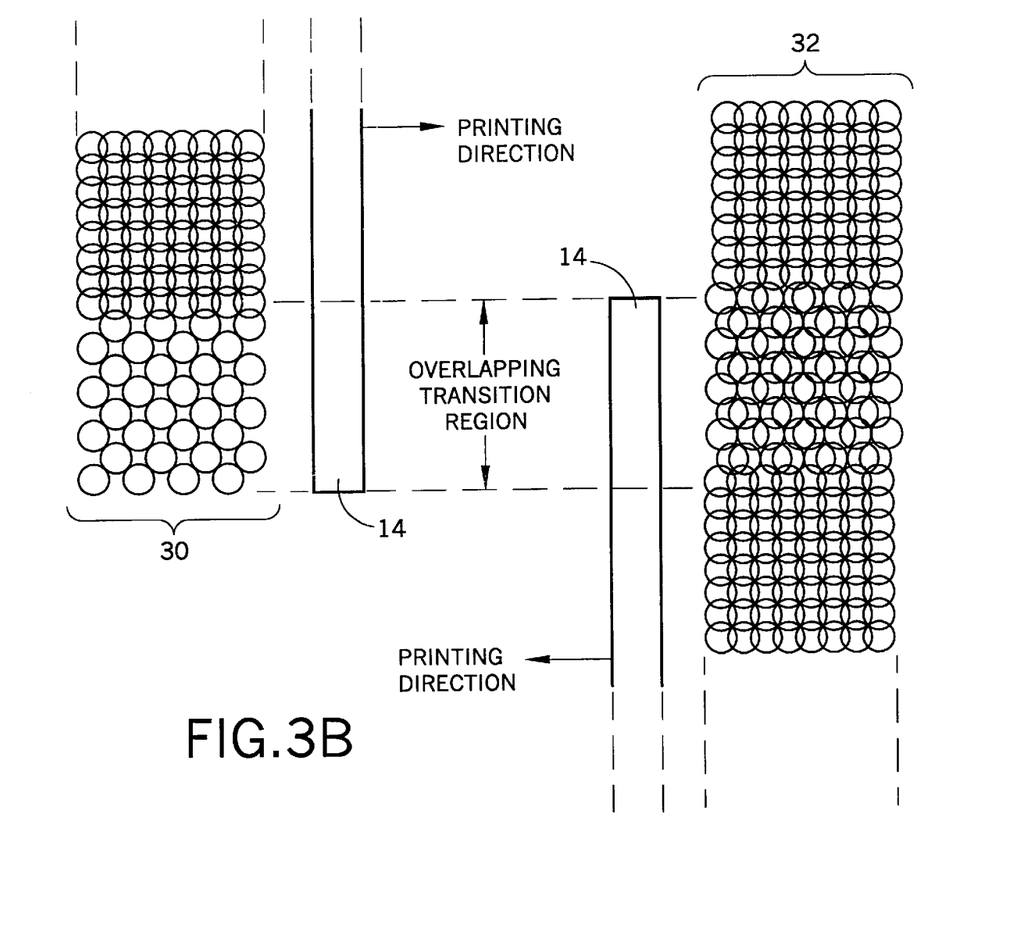
Figure 3C:
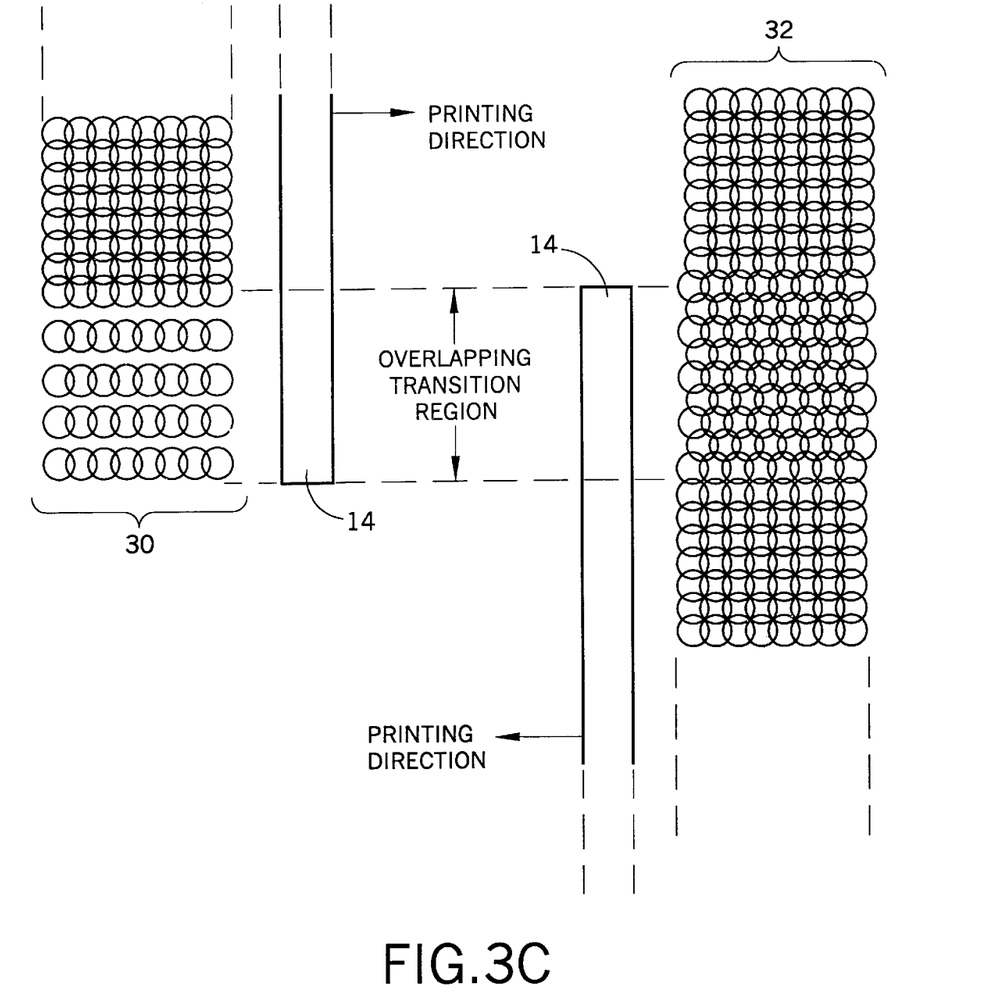
Figure 3D:
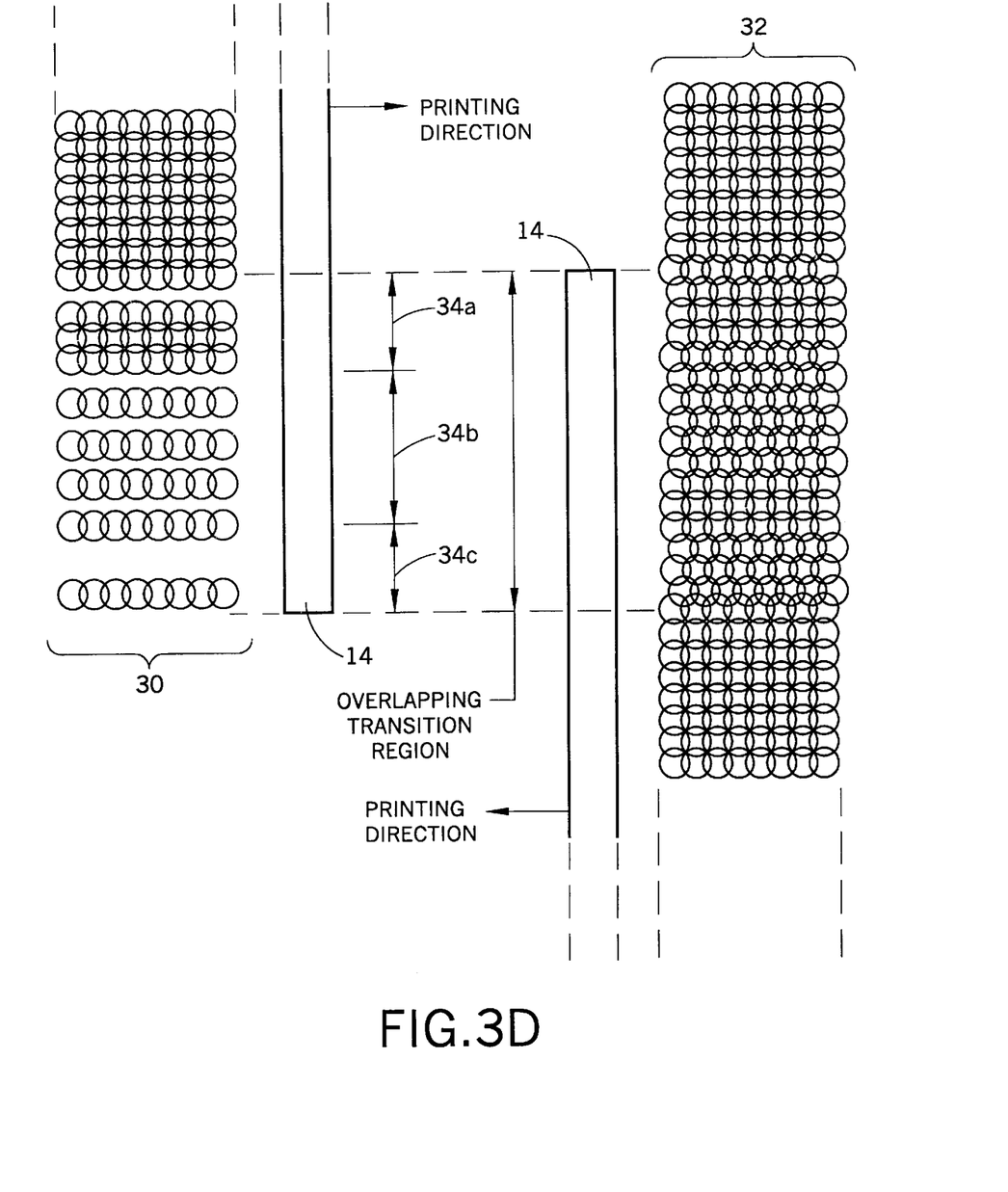
Figure 3E:
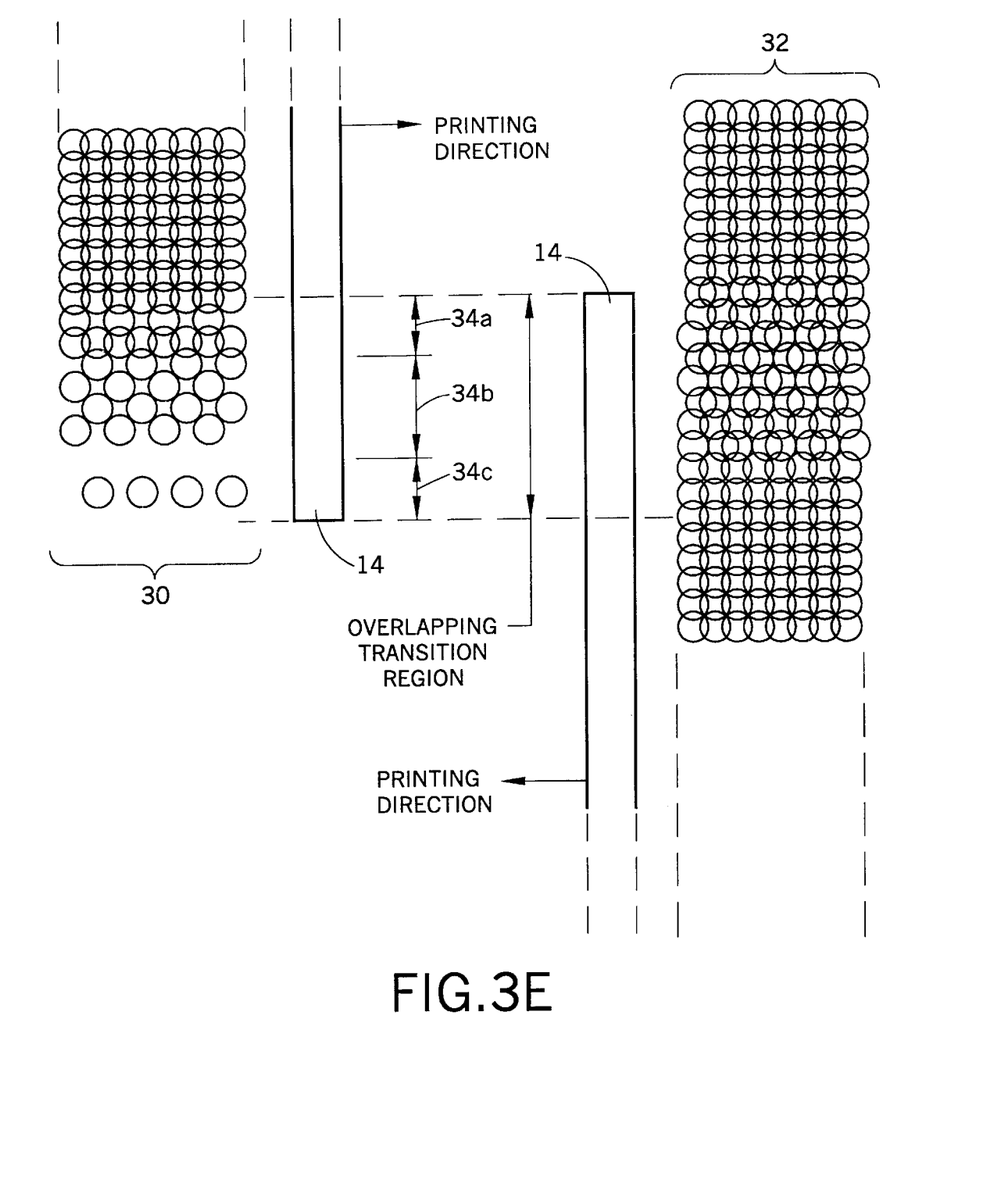

With reference to FIGS. 3A through 3E, a detailed view of the rendering of the transition region on successive printhead passes is diagrammatically illustrated. The individual circles represent individual pixels. Reference number 30, which corresponds to the rendering illustrated in FIG. 2B, generally indicates a column as rendered after the initial pass of the printhead 14. Reference number 32, which corresponds to the rendering illustrated in FIG. 2D, generally indicates the column as rendered after the second pass of the printhead 14. More specifically, FIG. 3A shows a pair of overlapping swaths where the overlap defines the transition region. With reference to FIGS. 3B and 3C, in preferred embodiments, half the pixels in the transition region are rendered in the first printerhead pass and the remaining half are rendered in the second reverse printerhead pass. The division of pixels into these two halves is optionally according to the checkerboard-like pattern shown in FIG. 3B or according to the alternating line pattern shown in FIG. 3C. In the alternating line pattern shown in FIG. 3C, vertically neighboring pixels in the transition regions are alternately included in the first portion of pixels and the second remaining portion of pixels, respectively, such that vertically neighboring pixels are alternately rendered during the first forward and second reverse passes of the printhead 14. Optionally, as illustrated in FIG. 3D, the transition regions are divided into contiguous vertically neighboring subregions 34a–c. Each subregion 34a–c has a predetermined ratio of pixels in the first portion of pixels that are rendered as the printhead 14 makes its pass in the first forward direction, and a predetermined ratio of pixels in the second remaining portion of pixels that are rendered as the printhead 14 makes its pass in the second reverse direction. In a preferred embodiment, the transition region is divided into three subregions 34a–c. An upper subregion 34a has approximately ¾ of its pixels in the first portion of pixels and approximately ¼ of its pixels in the second portion of pixels; a lower subregion 34c has approximately ¾ of its pixels in the second portion of pixels and approximately ¼ of its pixel in the first portion of pixels; and, a middle subregion 34b, located between the upper and lower subregions, has approximately ½ of its pixels in the first portion of pixels and approximately ½ of its pixel in the second portion of pixels. FIG. 3E shows an alternative arrangement of pixel placements where there are again three subregions with the same pixel proportions as shown in FIG. 3D, but the pixels are interleaved in a checkerboard-like pattern. Optionally, the number of subregions employed and ratios used are varied to achieve the imaging speed and quality desired for particular applications.

Figure 4:
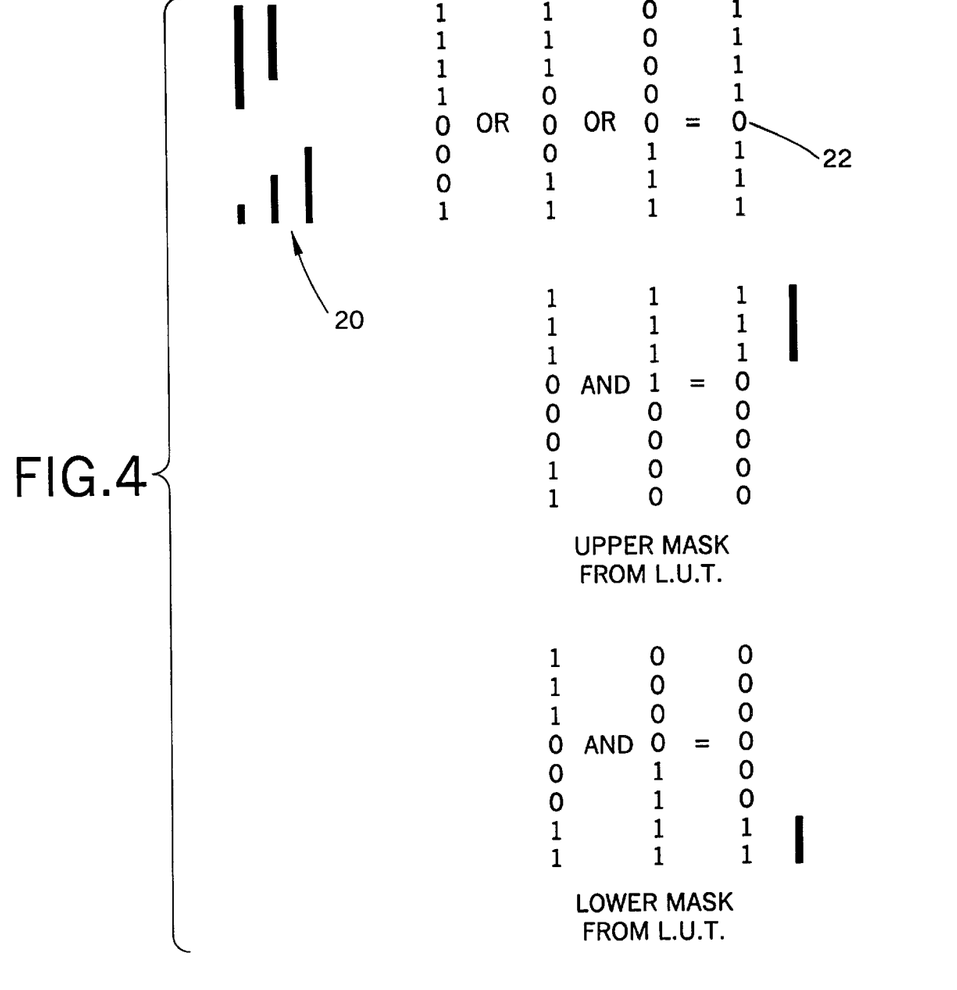
FIG. 4 is a diagrammatic illustration showing the detection of break points and masking of columns by a bi-directional scanning-head printer in accordance with aspect of the present invention.

With reference to FIG. 4 and continuing reference to FIGS. 1 through 3E, in a preferred embodiment, the data corresponding to each swath of the image is stepped through column by column. For each of the columns 20, a break 22 is sought by the detector circuit 18. If for some column a break 22 cannot be found then that column is rendered with a transition region as discussed above with reference to FIGS. 3A through 3E. To test for a break 22, the bit patterns for a current vertical array of pixels, the n preceding arrays and the n next arrays, where n is a small integer, are logically ORed together. For graphics and text a value of n=1 suffices, but in the presence of halftones a larger value of n is used. In this manner, a number (2n+1) of vertical arrays of pixels are used to define each column which columns correspond to vertical edges or details of the image. If, after ORing together the neighboring vertical arrays of pixels, there is a 0 bit in the result, then it serves as the break 22. The entire vertical height for each swath is not processed. Rather, only the portion where swaths overlap gets processed.

Where the presence of a break 22 is detected, for 35 each vertical array of pixels, the data for that array is reformatted. The patterns of pixel values, which occur below the break 22, are copied to a holding buffer for use in rendering the next swath on the reverse pass of the printhead 14. These patterns are masked off for the current forward pass of the printhead 14. Thus, when the current pass is run, only the pixels above the break 22 are printed. In a preferred embodiment, this processing is carried out quickly by using a look-up table accessed by the ORed pattern of data bits to obtain a mask which is logically ANDed with the data bits corresponding to the vertical arrays of pixels to preserve either the bits above the break 22 or the bits below it.

The example illustrated in FIG. 4 shows how the bit patterns for three vertical arrays of pixels are ORed together and checked for a break 22. Since the result contains a zero, this column 20 has a break 22. A look-up table accessed by the ORed result gives masks for extracting the top and bottom ends of the column. The top end is printed in the current swath with the first forward pass of the printhead 14 while the bottom end is printed in the following swath with the second reverse pass of the printhead 14.

Figure 5:
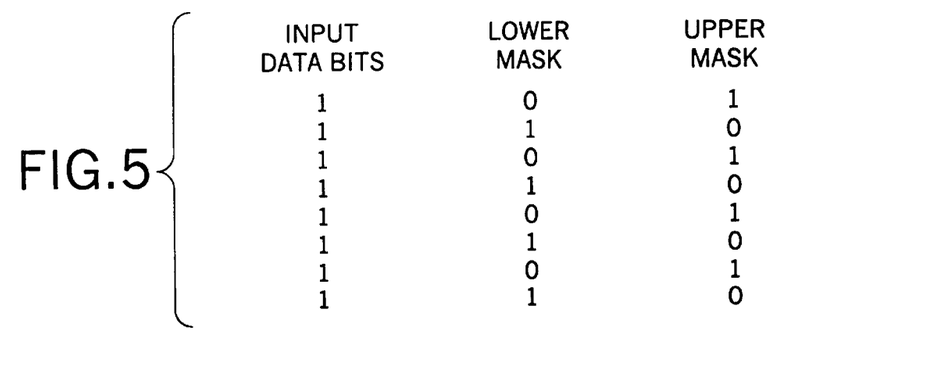
FIG. 5 is a diagrammatic illustration showing the masking of a transition region in accordance with aspects of the present invention; and, FIG. 6 is a flow chart illustrating the rendering process in accordance with aspects of the present invention.
Figure 6:
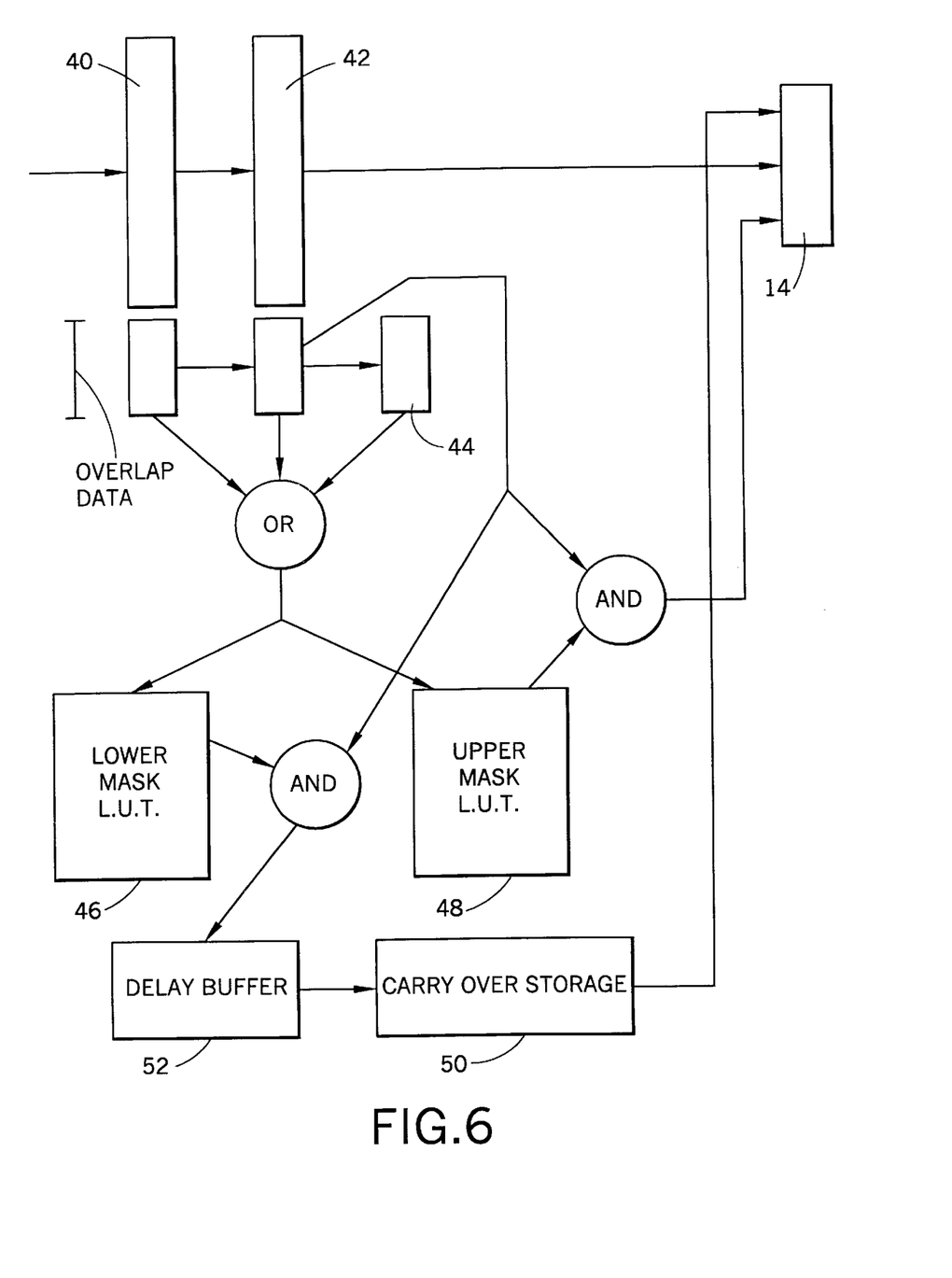

With reference to FIGS. 5 and 6, in a preferred embodiment, a look-up table is also employed to provide masks used in separating the pixels in transition regions. FIG. 5 illustrates input data bits for a transition region (all ones since there are no breaks) and two example masks for the forward and reverse passes of the printhead 14. The example masks shown produce a transition region where vertically neighboring pixels in the transition region alternately are rendered in the forward and reverse passes of the printhead 14 (see FIG. 3C for example). The input data bits are ANDed with the respective masks to determine the output. However, if a checkerboard-like pattern is used (see FIG. 3B for example), then an additional input bit or index is employed which registers whether the column is odd or even. Even and odd columns have masks that are inverted bit by bit so that upon rendering the checkerboard-like pattern is achieved.

With reference to FIG. 6, a block diagram illustrates the rendering process. Column data is successively loaded into a series of column data buffers 40–44 including: a previous column data buffer 40 which holds only data corresponding to the overlap region of the previously processed column; a current column data buffer 44 which holds data corresponding to the current column being processed; and, a next column data buffer which hold data corresponding to the next column to be processed. After each column is processed the column data is shifted to the following column data buffer. In processing each pass, data from the overlap regions of all three column data buffers is ORed together. The result is employed to access upper and lower mask look-up tables 46 and 48. The masks from the look-up tables are ANDed together with the data from the overlap region of the current column being processed. At the printhead 14, the current column is rendered in accordance with a combination of data including: data from a carry over storage buffer 50; current column data outside the overlap region; and, the data resulting from ANDing the upper mask with the data from the overlap region of the current column. The carry over storage buffer 50 holds the data resulting from ANDing the lower mask with data from the overlap region of the current column after the resulting data has been displaced one processing cycle by a delay buffer 52. Optionally, instead of using a separate lower mask look-up table 46, the lower mask is generated by inverting the mask obtained from the upper mask look-up table 48.

The invention has been described with reference to the preferred embodiments. obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for bi-directionally rendering an image comprising:
   (a) segmenting a horizontal swath of the image into a line of columns such that each column is made up of a vertical array of pixels;
   (b) detecting each column for vertical breaks therein;
   (c) defining transition regions for each column having no vertical breaks;
   (d) making a pass along the swath in a horizontal direction and during the pass;
      rendering in the swath: (i) pixels which are above each of the detected vertical breaks, (ii) pixels which are above each of the defined transition regions, (iii) a first portion of pixels located in each of the defined transition regions, and (iv) saved pixels from a previously made pass; and,
      saving for a subsequent pass: (i) pixels which are below each of the detected vertical breaks, (ii) pixels which are below each of the defined transition regions, and (iii) a second portion of pixels located in each of the defined transition regions;
   (e) advancing to a next horizontal swath;
   (f) reversing the horizontal direction;
   (g) repeating steps (a) through (f) until rendering of the image is complete.

2. The method according to claim 1, wherein consecutive passes vertically overlap.

3. The method according to claim 2, further comprising: adjusting an amount of vertical overlap between consecutive passes to optimize rendering speed and image quality.

4. The method according to claim 2, wherein the step of detecting each column for vertical breaks is limited to where consecutive passes vertically overlap.

5. The method according to claim 4, wherein an amount of vertical overlap between consecutive passes defines upper and lower boundaries between which the transition regions are contained.

6. The method according to claim 5, wherein the transition regions extend an entire vertical span of the vertical overlap from the upper boundary to the lower boundary.

7. The method according to claim 5, wherein the first and second portions of pixels located in each of the transition regions are exclusive of one another and collectively include all the pixels in each transition region respectively.

8. The method according to claim 7, wherein vertically neighboring pixels in the transition regions are alternately included in the first and second portions of pixels, respectively.

9. The method according to claim 7, wherein the transition regions are divided into contiguous vertically neighboring subregions such that each subregion has a predetermined ratio of pixels in the first and second portions of pixels, respectively.

10. The method according to claim 9, wherein the predetermined ratios of pixels in the first and second portions of pixels gradually decrease and increase respectively as subregions range from closer to the upper boundary to closer to the lower boundary.

11. The method according to claim 10, wherein each transition region is divided into three subregions including:
   an upper subregion having approximately ¾ of its pixels in the first portion of pixels and approximately ¼ of its pixels in the second portion of pixels;
   a lower subregion having approximately ¾ of its pixels in the second portion of pixels and approximately ¼ of its pixel in the first portion of pixels; and,
   a middle subregion located between the upper and lower subregions, said middle subregion having approximately ½ of its pixels in the first portion of pixels and approximately ½ of its pixel in the second portion of pixels.

12. A bi-directional image rendering system comprising:
   a printer having;
      an input which receives data corresponding to an input image;
      a printhead having a vertical height which, in accordance with the data, renders the image on a medium in swaths as it passes horizontally over the medium in opposing first and second directions; and,
      a medium advance device which advances the medium vertically past the printhead between horizontal passes of the printhead in the first direction and horizontal passes of the printhead in the second direction; and,
      a detector which detects breaks in columns, each column comprising an array of vertically neighboring pixels of the image;
   wherein as the printhead passes over the medium in the first direction, it renders pixels vertically above detected breaks, and as the printhead passes over the medium in the second direction, it renders pixels vertically below detected breaks.

13. The bi-directional image rendering system according to claim 12, wherein columns having no detected breaks are divided into three regions including:
   an upper region which includes pixels rendered as the printhead passes over the medium in the first direction;
   a lower region which includes pixels rendered as the printhead passes over the medium in the second direction; and, a transition region located between the upper and lower regions, said transition region including a first portion of pixels rendered as the printhead passes over the medium in the first direction and a second remaining portion of pixels rendered as the printhead passes over the medium in the second direction.

14. The bi-directional image rendering system according to claim 13, wherein the medium advance device advances the medium vertically past the printhead such that printhead passes over the medium in the first direction overlap with printhead passes over the medium in the second direction.

15. The bi-directional image rendering system according to claim 14, wherein an amount of overlap between printhead passes in the first and second directions defines the transition region in columns having no detected breaks.

16. The bi-directional image rendering system according to claim 15, wherein vertically neighboring pixels in transition regions are alternately included in the first portion of pixels rendered as the printhead passes over the medium in the first direction and the second remaining portion of pixels rendered as the printhead passes over the medium in the second direction.

17. The bi-directional image rendering system according to claim 14, wherein the detector detects for breaks where printhead passes in the first and second directions overlap.

18. The bi-directional image rendering system according to claim 14, wherein an amount of overlap between printhead passes in the first and second directions is substantially equal to ¼ of the printhead's vertical height.

19. The bi-directional image rendering system according to claim 14, wherein the medium advance device is tunable to vary an amount of overlap to optimize imaging speed and quality.

20. The bi-directional image rendering system according to claim 12, the printer is a printer selected from a group consisting of ink-jet printers, dot-matrix printers, and thermal-head printers.

21. The bi-directional image rendering system according to claim 12, wherein the detector is a hardware detector circuit included in the printer.

22. The bi-directional image rendering system according to claim 12, wherein the detector is part of a software printer driver employed by one of the printer and a computer workstation controlling the printer.

* * * * *